US012684354B2

(12) United States Patent
Fuladi et al.

(10) Patent No.: US 12,684,354 B2
(45) Date of Patent: Jul. 14, 2026

(54) METHODS AND APPARATUSES FOR DETERMINING SECURITY ATTACKS IN SOFTWARE-DEFINED NETWORKS

(71) Applicant: Telefonaktiebolaget LM Ericsson (publ), Stockholm (SE)

(72) Inventors: Ramin Fuladi, Istanbul (TR); Utku Gülen, Kadıköy (TR); Elif Ustundag Soykan, Stockholm (SE); Ayse Bilge Ince, London (GB); Leyli Karacay, Ümraniye (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

(21) Appl. No.: 18/835,988

(22) PCT Filed: Feb. 22, 2022

(86) PCT No.: PCT/TR2022/050160
§ 371 (c)(1),
(2) Date: Aug. 5, 2024

(87) PCT Pub. No.: WO2023/163668
PCT Pub. Date: Aug. 31, 2023

(65) Prior Publication Data
US 2025/0203369 A1     Jun. 19, 2025

(51) Int. Cl.
*H04W 12/121*     (2021.01)
*H04L 41/142*     (2022.01)
(Continued)

(52) U.S. Cl.
CPC ......... *H04W 12/121* (2021.01); *H04L 41/142* (2013.01); *H04L 41/342* (2022.05); *H04W 24/08* (2013.01)

(58) Field of Classification Search
CPC . H04L 41/342; H04L 41/142; H04L 63/1458; H04L 63/1425; H04W 12/121; H04W 24/08
(Continued)

(56) References Cited

U.S. PATENT DOCUMENTS 8,275,875 B2 *   9/2012   Pruthi ................... H04L 41/142
                                                        709/224
9,055,006 B2 *   6/2015   Chesla ................ H04L 63/1416
(Continued)

OTHER PUBLICATIONS

International Search Report and Written Opinion of the International Searching Authority, PCT/TR2022/050160, mailed Aug. 18, 2022, 11 pages.
(Continued)

*Primary Examiner* — Amare F Tabor
(74) *Attorney, Agent, or Firm* — Sage Patent Group

(57)     ABSTRACT

A technique for determining security attacks in wireless communication systems is disclosed. A method implementation of the technique is performed by a controller and includes obtaining a first statistics based on an amount of messages received from at least one packet forwarding entity within a pre-defined time interval, t, wherein the first statistics is a time-domain data; obtaining a second statistics based on at least one arriving-time difference, $T_d$, between two consecutive messages; detecting an anomaly based on the second statistics; determining, if the anomaly is detected, a security attack based on the first statistics; and initiating a security attack notification to an orchestrator.

16 Claims, 13 Drawing Sheets

(51) Int. Cl.
*H04L 41/342* (2022.01)
*H04W 24/08* (2009.01)

(58) Field of Classification Search
USPC ........................................................ 726/23
See application file for complete search history.

(56) References Cited

U.S. PATENT DOCUMENTS

| | | | | |
|---|---|---|---|---|
| 9,521,162 | B1 | 12/2016 | Zand et al. | |
| 10,122,740 | B1 * | 11/2018 | Finkelshtein ....... | H04L 63/1441 |
| 10,218,727 | B2 * | 2/2019 | Di Pietro ............ | H04L 63/1425 |
| 11,184,387 | B2 * | 11/2021 | Han ...................... | H04L 63/145 |
| 11,522,879 | B2 * | 12/2022 | Koral ..................... | H04L 63/00 |
| 11,968,115 | B2 * | 4/2024 | Raiciu ................. | H04L 43/0876 |
| 12,074,888 | B2 * | 8/2024 | Kim .................... | H04L 63/1416 |
| 2010/0284282 | A1 * | 11/2010 | Golic ................... | H04L 43/022 |
| | | | | 370/242 |

OTHER PUBLICATIONS

Aladaileh, Mohammad et al., "Entropy-Based Approach to Detect DDoS Attacks on Software Defined Networking Controller," Computers, Materials, & Continua, DOI:10:32604/cmc.2021.017972, Jan. 2021, 69(1), 19 pages.

* cited by examiner obtaining $x$ (first statistics) — 401 obtaining $T_d$ (second statistics) — 402 detecting anomaly — 403 determining security attack — 404 initiating security attack notification — 405

METHODS AND APPARATUSES FOR DETERMINING SECURITY ATTACKS IN SOFTWARE-DEFINED NETWORKS

CROSS REFERENCE TO RELATED APPLICATIONS

This application is a 35 U.S.C. § 371 national stage application of PCT International Application No. PCT/TR2022/050160 filed on Feb. 22, 2022, the disclosure and content of which is incorporated by reference herein in its entirety.

TECHNICAL FIELD

The present disclosure generally relates to determining security attacks in wireless communication systems. More particularly but non-exclusively, a technique for determining Distributed Denial of Service (DDoS) attacks in Software-Defined Networks (SDN) is presented. The technique may be embodied in methods, computer programs, apparatuses and systems.

BACKGROUND

The concept of confidentiality, integrity, and availability, also known as the CIA triad, is considered the core underpinning of the technical field of network security. Confidentiality means the protection of data and resources from unauthorized viewing and access, while integrity means the protection of data from unauthorized changes. As for availability, it ensures that authorized users have access to systems and resources.

A known threat, targeting the availability of the networks, is the SDN-based DDoS attacks which aim at denying the access of legitimate users to the network resources by flooding, for example, a service provider server with massive traffic.

The DDoS attackers use large number of compromised devices, sometimes also called zombies. What is mainly targeted in the DDoS attacks is the SDN controller, as it is the network's brain. If the attackers succeed in attacks over the controller, they could cripple the entire network. Therefore, it is essential to detect DDoS attacks on the controller with a high accuracy and a lower false-positive rate.

Even if the mechanism of the DDoS attacks is well-known, the task of distinguishing a DDoS attack packet traffic from normal packet traffic is challenging due to some reasons, such as spoofed source IP addresses which makes the tracing back of the source of the attack difficult.

Known entropy-based approaches for DDoS attack detection which are mainly used to calculate the distribution randomness of some attributes in the network packets' headers. The entropy is a measure of the uncertainty associated with a random variable. The bigger of an event's uncertainty, the higher of its entropy value. The entropy-based approaches suffer from some drawbacks. They use two algorithms, namely detection algorithm and confirmation algorithm, to mitigate the intruders. The amount of traffic data does not allow real-time analysis of details. The entropy-based approaches map a probability distribution to a single entropy value, yielding information loss existing in the Probability Distribution Function, PDF, for example. Two probability distributions with different distribution characteristics may well have the same entropy. Hence, entropy-based solutions are prone to higher false-positive and lower detection rates.

SUMMARY

Accordingly, there is a need for a technique that enables reliable and effective determination of a security attack which avoids one or more of the problems discussed above, or other problems.

According to a first aspect, a method for determining a security attack in a wireless communication system is provided. The method is performed by a a controller and comprises steps of obtaining a first statistics based on an amount of messages received from at least one packet forwarding entity within a pre-defined time interval, wherein the first statistics is a time-domain data; obtaining a second statistics based on at least one arriving-time difference between two consecutive messages; detecting an anomaly based on the second statistics; determining, if the anomaly is detected, a security attack based on the first statistics; and initiating a security attack notification to an orchestrator.

According to an embodiment for detecting the anomaly, the obtained single arriving-time difference is compared with an obtained pre-trained threshold value. The anomaly is detected, when the single arriving-time difference is less than the pre-trained threshold value. The obtained/pre-trained threshold value is an intersection point of an empirical probability distribution curve obtained from a set of arriving-time difference in a pre-trained normal packet traffic and an empirical probability distribution curve obtained from a set of arriving-time difference in a pre-trained attack packet traffic.

According to another embodiment for detecting the anomaly, an obtained probability distribution of a set of arriving-time difference (in the current packet traffic) is compared with a probability distribution of the set of arriving-time difference obtained in the pre-trained normal packet traffic. The obtained probability distributions are at least one of Cumulative Distribution Function or Probability Distribution Function in which logarithmic values of arriving-time difference are used for easier computation.

Upon detecting the anomaly based on any one of the preceding embodiments or both, it is determined whether the anomaly is caused by a security attack or not. For this, an obtained probability distribution of frequency-domain data (in the current packet traffic) is compared with at least one of a probability distribution of frequency-domain data obtained in the pre-trained normal packet traffic or in the pre-trained attack packet traffic. The frequency-domain data are obtained by applying Discrete Fourier Transform to the first statistics (the time-domain data based on the amount of messages). The probability distributions (acting as feature sets) of frequency-domain data obtained in the pre-trained normal and attack packet traffics are used to train a machine learning model or a statistical inference model, or both.

In the method steps disclosed above, the messages received from the at least one packet forwarding entity within the pre-defined time interval are Packet-In messages which are encapsulated as unknown packets according to a protocol employed by the controller. The employed protocol is an OpenFlow protocol used for communication between the at least one packet forwarding entity and the controller. The at least one packet forwarding entity is a physical or a virtual OF-switch, whereas the controller is an SDN controller being a piece of hardware or software distributed over different entities, either physical or virtualized. The security attack determined by the SDN controller is a DDoS attack.

According to a second aspect, a controller for determining a security attack in a wireless communication system is provided. The controller performs the method of the first aspect. The corresponding embodiments for the method disclosed above are also applicable for the controller.

According to a third aspect, a controller for determining a security attack in a wireless communication system is provided. The controller comprises modules configured to perform the method of the first aspect. The corresponding embodiments for the method disclosed above are also applicable for the modules.

According to a fourth aspect, a computer program or computer program product for determining a security attack in a wireless communication system is provided. The computer program product comprises instructions which, when the computer program is executed by a processor, cause the controller to carry out a method in accordance with the first aspect.

According to a fifth aspect, a computer readable storage medium for determining a security attack in a wireless communication system is provided. The computer readable storage medium comprises instructions which, when executed by a processor, cause the controller to carry out a method in accordance with the first aspect. The computer readable storage medium could be a non-transitory computer readable storage medium, such as a semiconductor memory, DVD, CD-ROM, and so on.

According to a sixth aspect, a system for determining a security attack in a wireless communication system is provided. The system comprises at least one controller according to a second aspect, at least one packet forwarding entity and at least one orchestrator.

Advantageously these methods, this controller, these modules, this computer program (product), this computer readable storage medium and this system provide reliable and effective determination of a security attack in a wireless communication system.

It is to be noted that any feature of the first, second, third, fourth, and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of exemplary embodiments, with reference to the accompanying drawings, in which.

DETAILED DESCRIPTION

Figure 1:
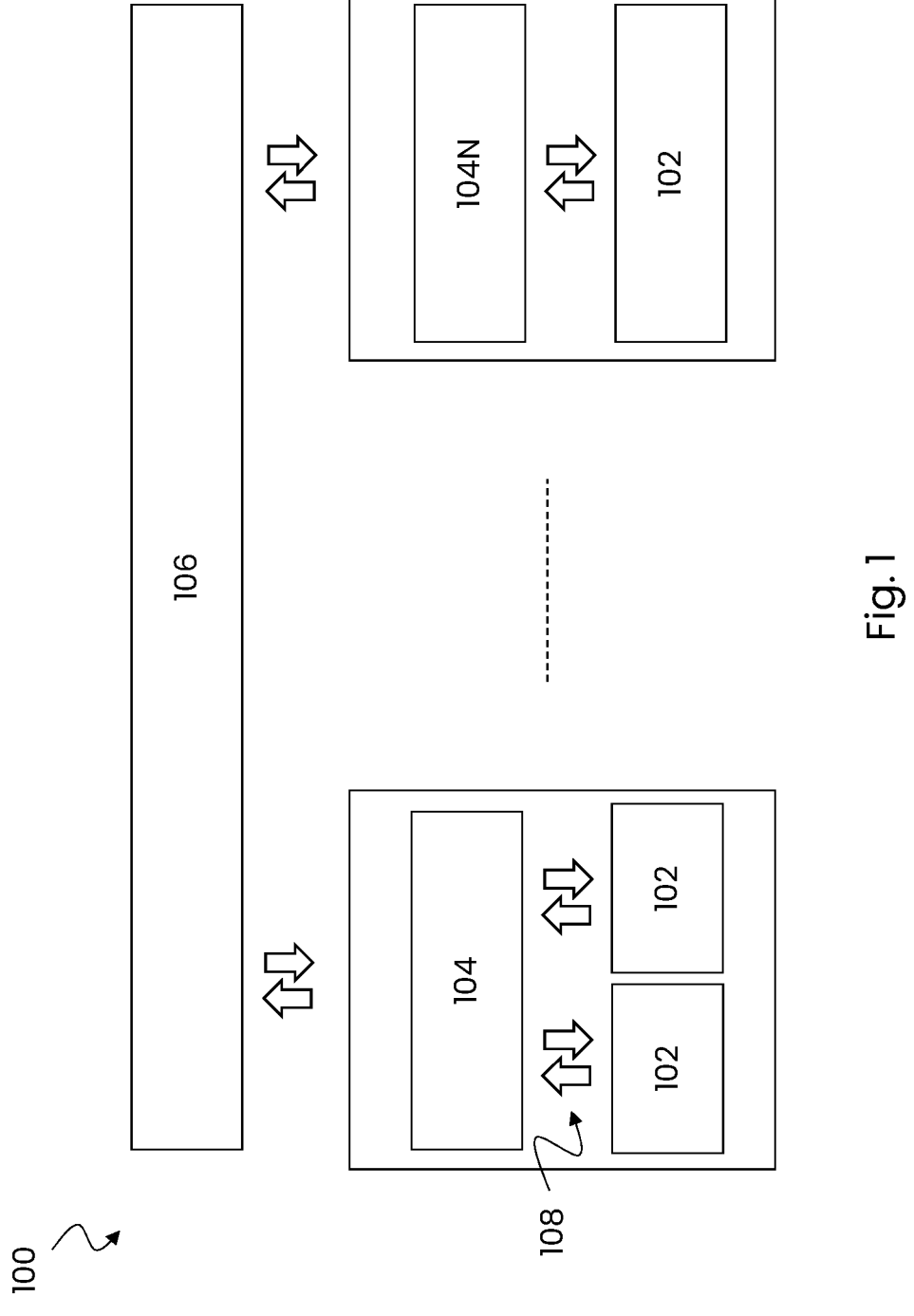
FIG. 1 shows a schematic diagram illustrating exemplary compositions (system) of N controllers, a plurality of packet forwarding entities, and an orchestrator according to embodiments.

An example system (100) of N controllers (104), a plurality of packet forwarding entities (102), and an orchestrator (106) is illustrated herein in FIG. 1.

It will be appreciated that members of the system (100) are merely exemplary and that the examples herein may be generalized to many network nodes.

Being an emerging architecture, the examples will be given below based on the SDN architecture where the controllers (104), due to their software-based nature, can easily be configured to determine the security (DDos) attacks. Hence, network resources can quickly be secured and optimized.

SDN improves the networking management and monitoring capabilities by separating data plane and control plane. Each network is divided into three planes of control, data, and management (application) planes. In traditional networking architecture, all three planes reside in single network devices, such as switches and routers. The device is responsible for carrying out all processes related to each plane. Therefore, the traditional architectures cannot meet current networking demands including flexibility, scalability, and central controlling.

SDN addresses the aforementioned problems by introducing the central controlling paradigm. In the SDN, the control plane is decoupled from the data (forwarding) plane. The controller (104) can monitor and control several packet forwarding entities (102) in the network simultaneously. The packet forwarding entity (102) may be a forwarder, a switch, a router, a firewall, or the like in a conventional network. The SDN controllers (104) employ specific protocols, such as OpenFlow, OF, protocols, to communicate with the packet forwarding entities (102).

Figure 2:
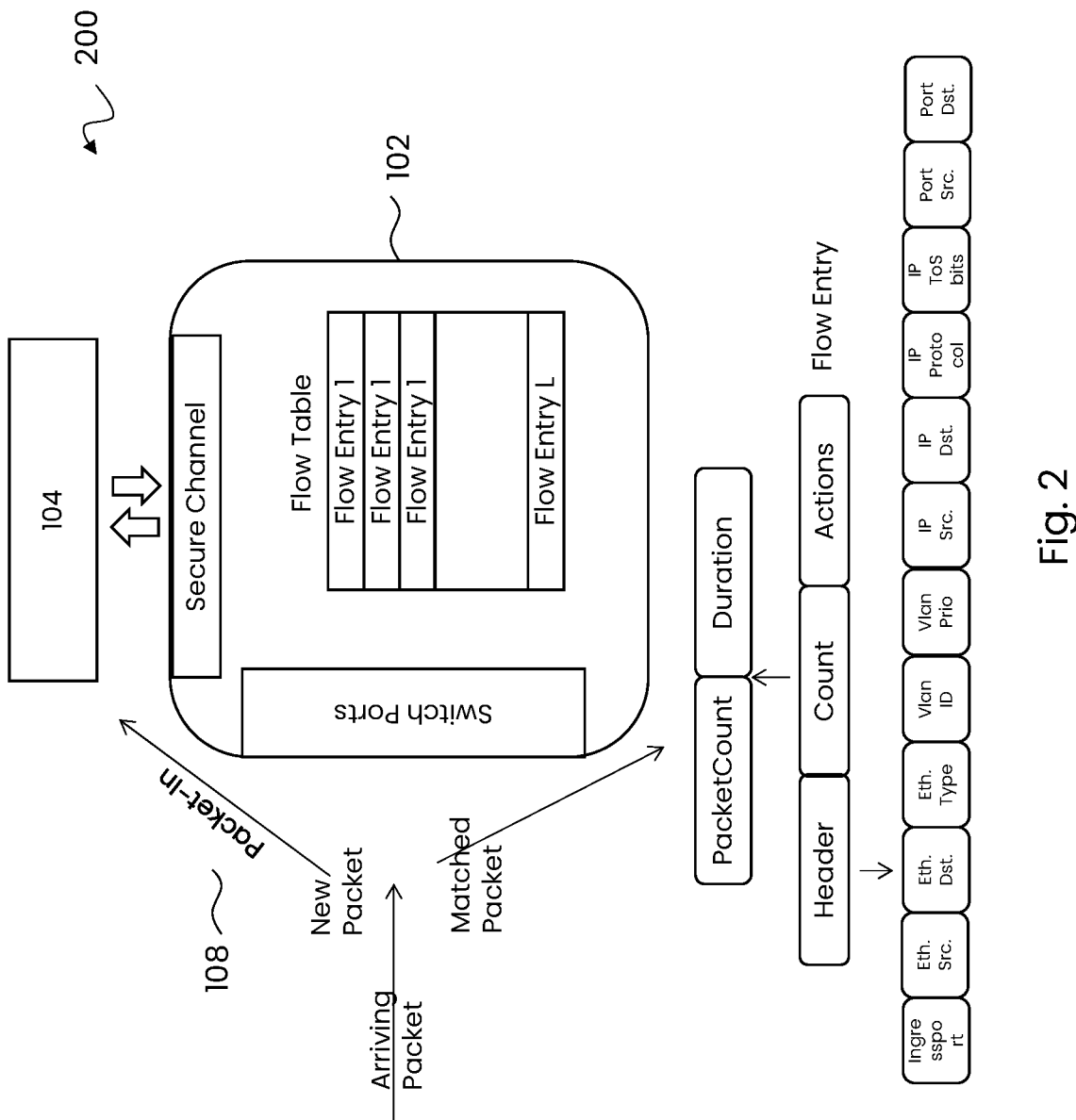
FIG. 2 shows a flowchart of a process according to an OF protocol.

FIG. 2 shows a flowchart (200) of a process according to the OF protocol. Each OF-switch (102) has one or more flow tables. Each entry of a flow table is the information related to previous packets arrived at the OF-switch (102). It mainly includes three parts of header, counter, and action. IP addresses, ports, type of the protocols etc. are recorded in the header part. The OF-switch (102) compares the arriving packet with the headers of the flow entries in the flow table. If any match is found, the associated action is executed and the counter of the entry is increased by one. If not matched, the new (unknown) packet is encapsulated into a Packet-In message (108) and sent to the controller (104), according to the OF-protocol. Upon receiving the Packet-In message (108), the controller (104) specifies the required action and registers the information of the packet with the corresponding action in the flow table of the OF-switch (102) as a new entry.

The centralization of the controller (104) makes the SDN an attractive target for the DDoS attacks, as the successful exploitation of the attack creates a single point of failure. Thanks to the software-based nature of the SDN, various statistics can be extracted and used as the signature to spot the DDoS attack traffic.

In the following, an example realization of the technique presented herein, which builds upon the above-described SDN example, will be described in order to elucidate the principles laid out above.

Figure 3:
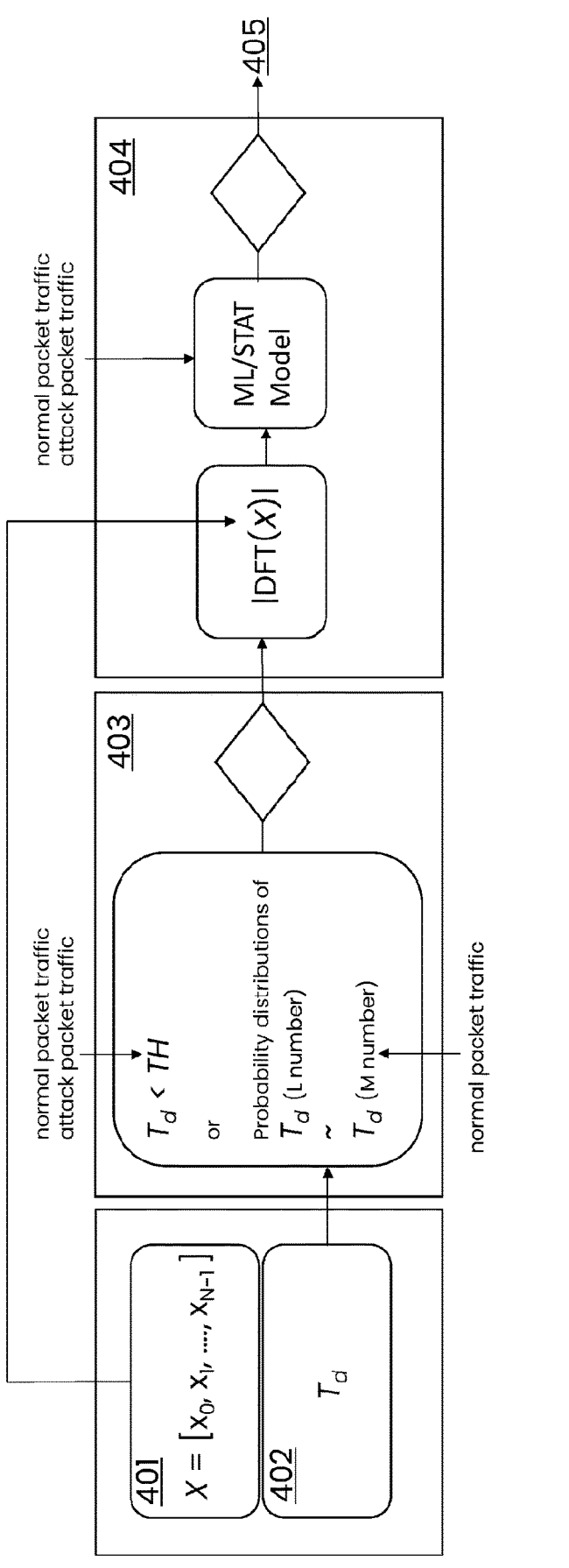
FIG. 3 shows a schematic diagram illustrating the main scheme of the invention.

FIG. 3 illustrates the main scheme of the invention.

This invention relates to the technique that enables determining a security attack in a wireless communication system (100) reliably and effectively by obtaining (401, 402) two types of statistics, an amount, X, of and an arriving-time difference, $T_d$, of Packet-In messages (108), in packet traffics;

detecting (403) an anomaly (distinction) by applying statistical inference to the second type of statistics (Ta);

determining (404) (whether the anomaly is caused by) a security attack by comparing the probability distributions (feature sets) of the frequency-domain data obtained from the first type of statistics (x);

initiating (405) a security attack notification by the controller (104) to an orchestrator (106), in case of determining (404) the security attack.

The main scheme of the invention is applicable in all kinds of packet traffics, be it current, normal or attack packet traffic.

Figure 4:
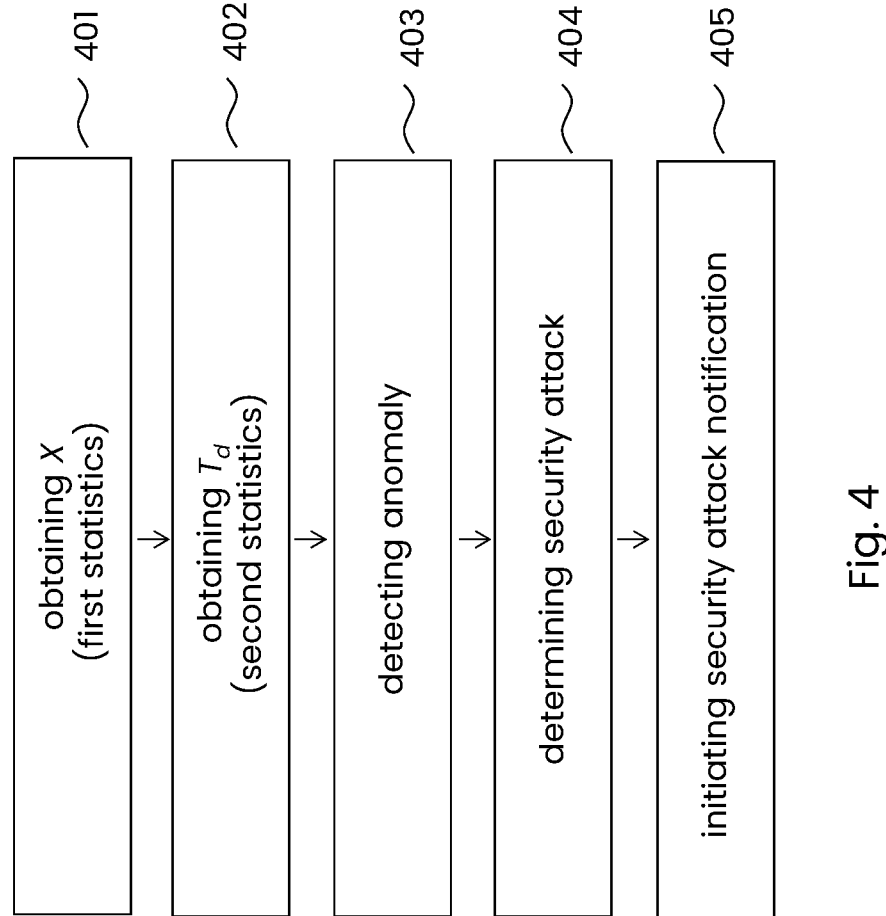
FIG. 4 shows a flowchart illustrating the main method steps.

FIG. 4 illustrates the main method steps of performing the inventive solution.

As described above, due to the spoofed source IP addresses used by the attackers, the number (count) of Packet-In messages (108), which are received from at least one packet forwarding entity (102) to the controller (104), can be expected to increase during the attack. As an initiation of or an input to the inventive technique, namely two types of statistical parameters regarding these messages (108) are obtained (401, 402) to be observed in the later steps (403, 404) whether there is any change in the pattern of these parameters by the time.

One of these parameters is the number (count) of Packet-In messages (108) received from at least one packet forwarding entity (102) to the controller (104) within a pre-defined time interval, t. A time-series data, $X=[x_0, x_1, \ldots, x_{N-1}]$, is generated (401) accordingly. If it is assumed that t=2 ms and N=256 and that 10, 5, 7, and 4 messages (108) arrived at the controller (104) in the first, second, third and $N^{th}$ time intervals of 2 ms, respectively, then, the time-series data would be $X=[10, 5, 7, \ldots, 4]$.

An exemplary algorithm to obtain (401) the count/number (N elements) of Packet-In messages (108) received from at least one packet forwarding entity (102) to the controller (104) within a pre-defined time interval, t, is as follows:

```
1:    function Amount-of-messages_Generation (t, N)
2:        X <- [ ]   // where <- means right value assign to left variable
```

-continued

```
3:        i <- 1
4:        for i ≤ N do
5:            Counter <- 0
6:            Timer <- Start_timer
7:            while Timer ≤ t do
8:                if New Packet_In message arrived then
9:                    Counter <- Counter + 1
10:               end if
11:           end while
12:           X||Counter, where ||stands for concatenation
13:           Counter <- 0
14:           Timer <- Reset_timer
15:           i <- i+1
16:       end for
17:       return X
```

Another parameter is the arriving-time difference, $T_d$, between two consecutive messages (108) and is obtained (402), for example, if the second and the third messages (108) arrive at the controller (104) at t1 and t2 time stamps, $T_d$ would equal to $T_d$=t2−t1.

From the above example realizations, it can be seen that these massages may be the Packet-In messages (108) encapsulated as unknown packets by the OF-switch (102) according to the OF protocol employed by the SDN controller (104).

Although the examples herein are described in terms of one OF-switch (102), it will be appreciated that there may be a plurality of OF-switches (102) which may be a physical or a virtual one.

Following the step mentioned above, the anomaly is detected (403) based on the obtained (402) arriving-time difference or differences, Ta. The detection of anomaly (403) can be performed in two ways, either by comparing a single arriving-time difference, $T_d$ with an obtained pre-trained threshold value, TH or by comparing a probability distribution of a set of arriving-time difference, $T_d$ obtained in a current packet traffic with a probability distribution of another set of arriving-time difference obtained in a pre-trained normal packet traffic. The two ways of anomaly detection (403) are called thereafter as threshold-based approach and distribution-based approach, respectively.

As can be seen, for both ways of detection, there needs to be training phases in which both normal and attack packet traffics are employed.

Figure 5:
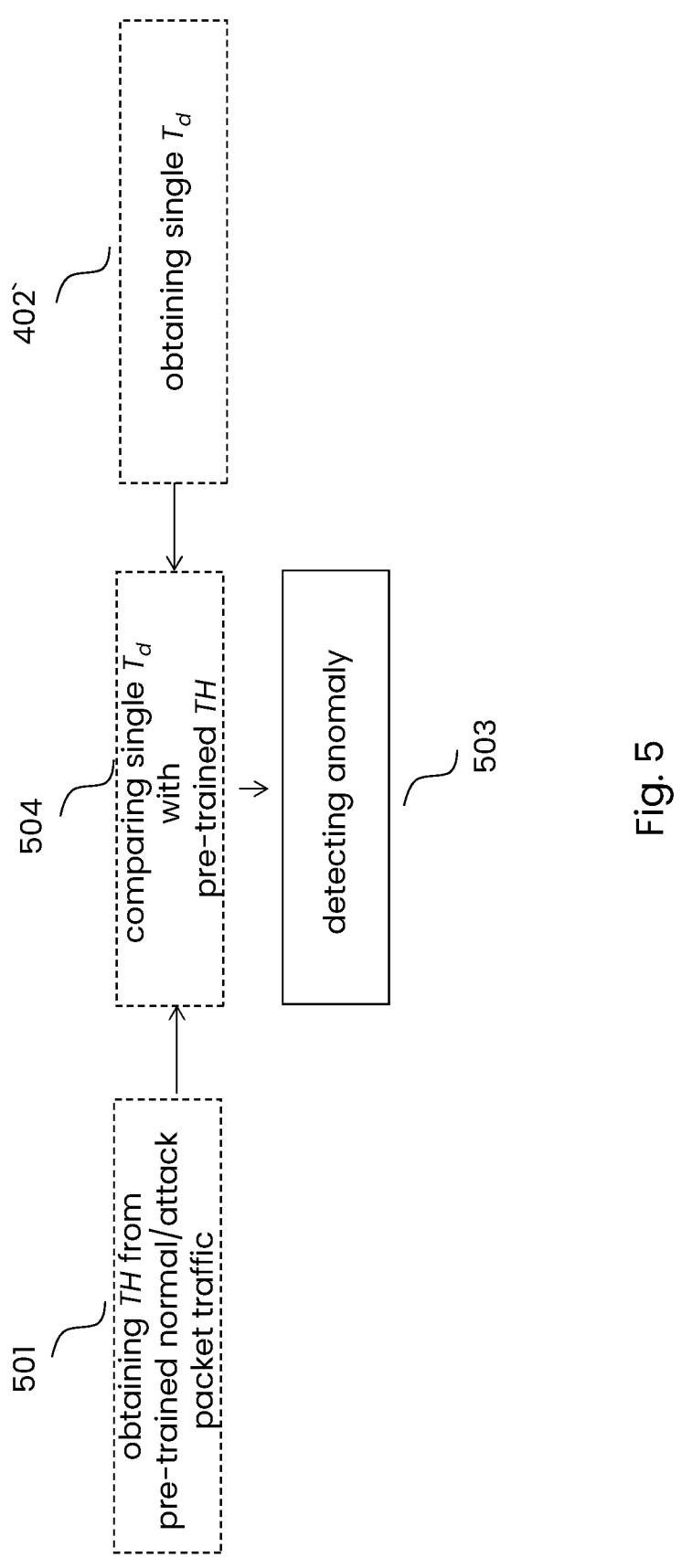
FIG. 5 shows a flowchart illustrating the method steps of detecting the anomaly according to the threshold-based approach.
Figure 6:
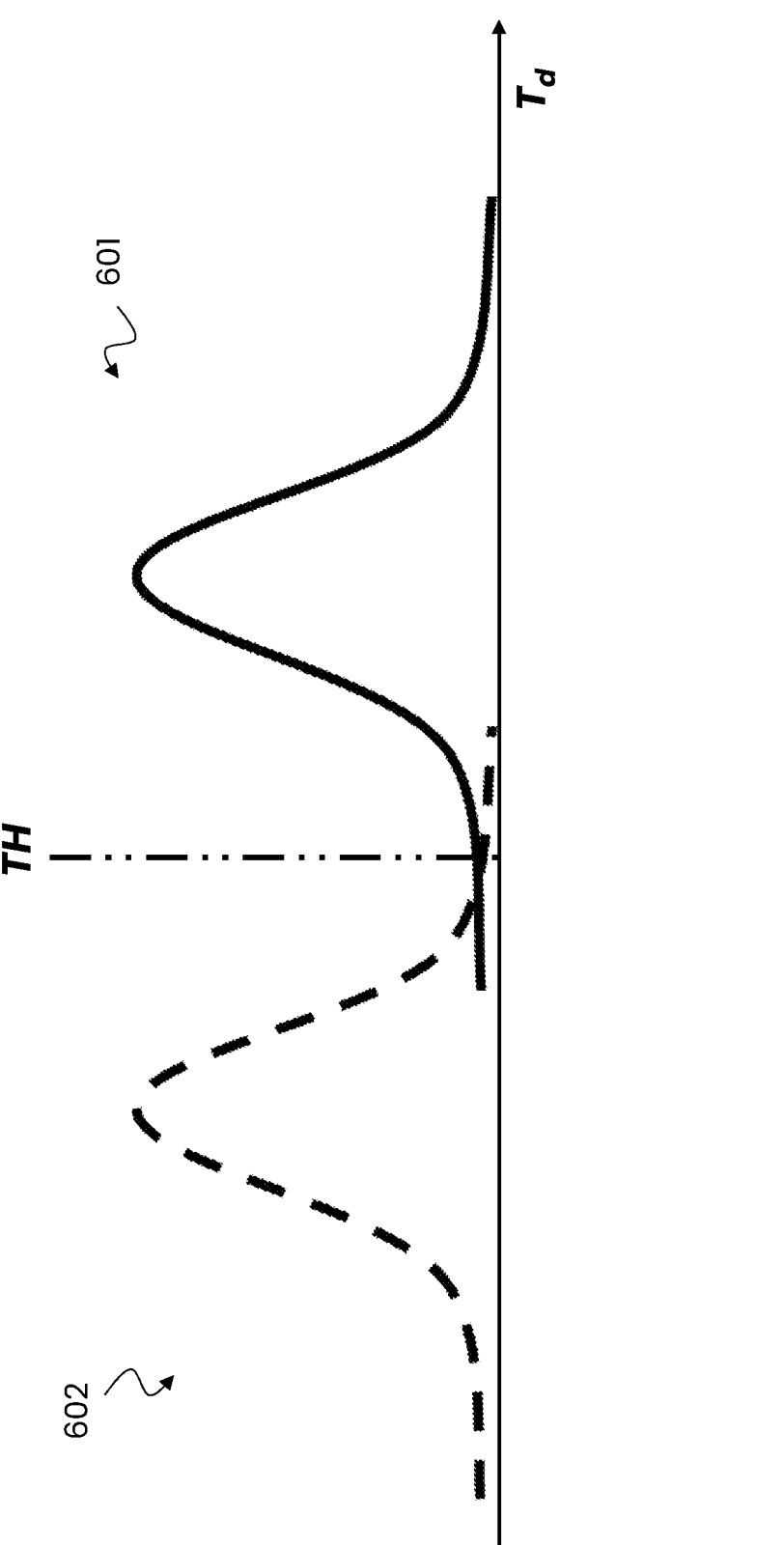
FIG. 6 shows a schematic diagram illustrating the empirical probability distribution curves according to the threshold-based approach for detecting the anomaly.

FIGS. 5 and 6 illustrate the related method steps and the empirical probability distribution curves, respectively, according to the threshold-based approach.

In the threshold-based approach, an arriving-time difference, $T_d$, between two consecutive messages (108) in the current packet traffic is compared (504), as soon as obtained in the previous step (402), with a (fixed, single-value) pre-trained threshold value, TH. The pre-trained threshold value, TH, is obtained (501) based on empirical probability distribution curves (601, 602) obtained from a set, M number, of the arriving-time difference, $T_d$, in the pre-trained normal packet traffic and a pre-trained attack packet traffic, respectively. The pre-trained threshold value, TH, is an intersection point of the empirical probability distribution curve (601) obtained from a set, M number, of the arriving-time difference, $T_d$, in the pre-trained normal packet traffic and the empirical probability distribution curve (602) obtained from a set, M number, of the arriving-time difference, $T_d$, in the pre-trained attack packet traffic.

When the single arriving-time difference, $T_d$, is compared (504) with the pre-trained threshold value, TH, the anomaly is detected (503), if the single arriving-time difference, $T_d$, is less than the pre-trained threshold value, TH. In case of detecting the anomaly (503), the next step of determining (404) the security attack is initiated.

As said, in addition to the threshold-based approach, the method of anomaly detection (503) presented herein may further rely on the distribution-based approach.

Figure 7:
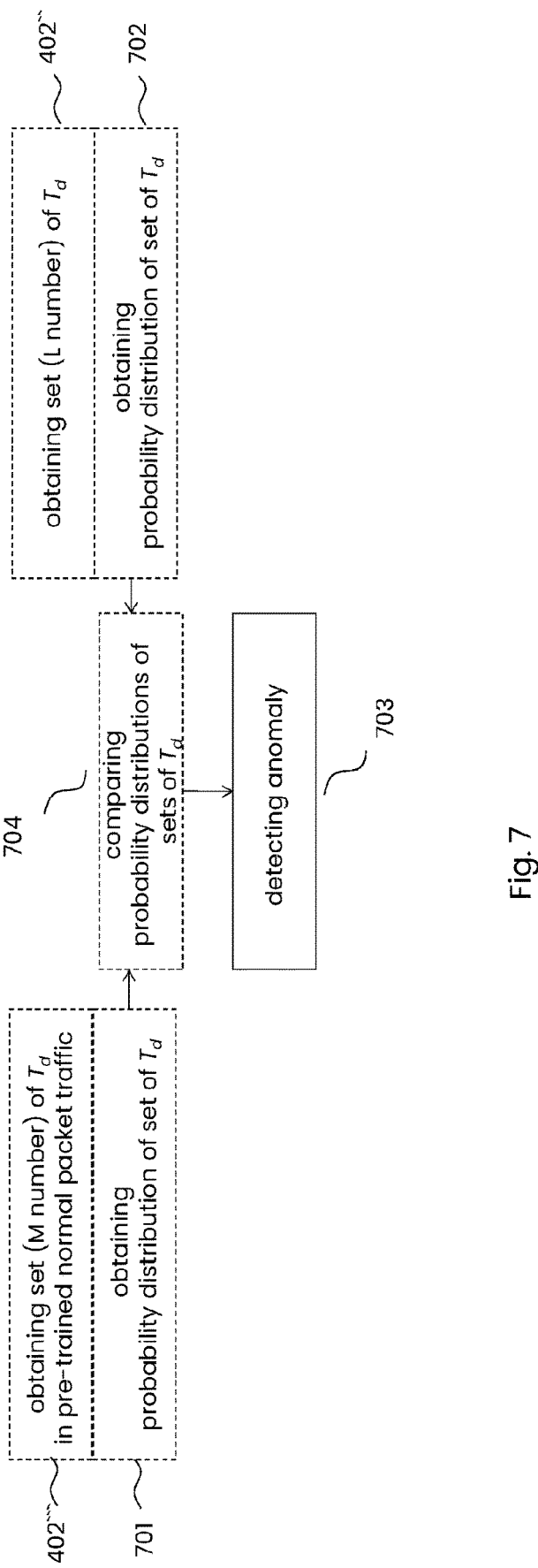
FIG. 7 shows a flowchart illustrating the method steps of detecting the anomaly according to the distribution-based approach.

FIG. 7 illustrates the related method steps according to the distribution-based approach for detecting (703) the anomaly.

In the distribution-based approach, a set, L number, of arriving-time difference, $T_d$, which is obtained in the current packet traffic in the previous step (402"), is taken into account. A probability distribution of the set of arriving-time difference, $T_d$, is then obtained (702). This probability distribution is compared (704) with an already available (701) probability distribution of a set, M number, of arriving-time difference, $T_d$, obtained (402") in the pre-trained normal packet traffic.

In the comparison (704), if these probability distributions of sets of arriving-time difference, $T_d$, differ from each other, the anomaly is detected (703). For example, if the set of arriving-time difference, $T_d$, for normal packet traffic follows Normal Gaussian distribution, and the set of arriving-time difference, $T_d$, for attack packet traffic follows Poisson distribution, this difference between the distributions is considered as anomaly. As another example, a case, where both normal and attack packet traffics follow the same distribution, such as Normal Gaussian distribution, but with different statistics (i.e. mean and variance), is also considered as anomaly. In case of detecting the anomaly (703), the next step of determining (404) the security attack is initiated.

Here, in the comparison (704) of probability distributions, either a Cumulative Distribution Function, CDF, is compared with another CDF or a Probability Distribution Function, PDF, is compared with another PDF. Both comparisons can be done at the same time as well. In case of CDF, Kolmogorov-Smirnov, KS, test can preferably be utilized. In case of PDF, various distance metrics, such as Kullback-Leibler, KL, divergence, can be employed.

It will be understood that, the two ways of anomaly detection (403, 503, 703), threshold-based and distribution-based approaches, may be employed interchangeably (additionally, alternatively) or simultaneously (concurrently).

Figure 8:
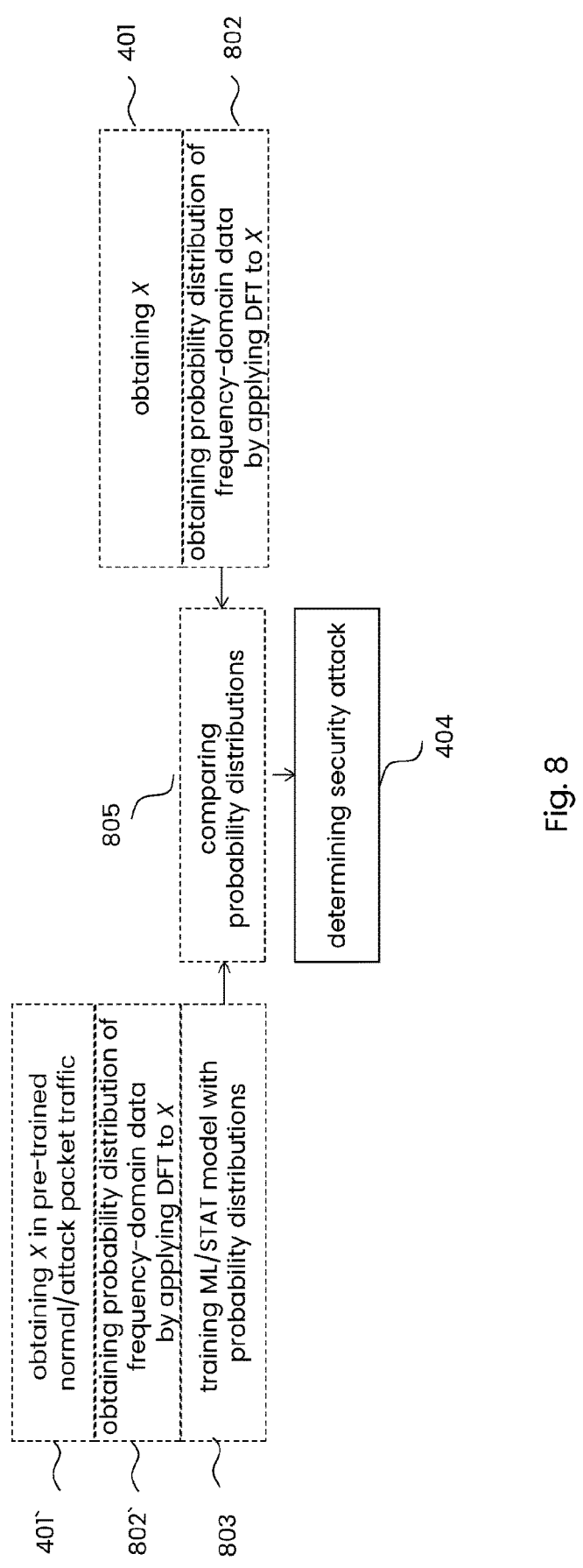
FIG. 8 shows a flowchart illustrating the method steps of determining the security attack.

FIG. 8 illustrates the method steps of determining the security attack (404) as will be explained further below.

Once a decision on detecting the anomaly (403, 503, 703) in the previous step is made, the obtained (401) amount of messages (in other words, the number of elements of the time-series data, $X=[x_0, x_1, \ldots, x_{N-1}]$) is used in the next step of determining the security attack (404) in order to determine whether the anomaly is caused by the security attack.

For this, a feature set, R, (a probability distribution of frequency-domain data) is obtained (802) by applying Discrete Fourier Transform, DFT, to the first statistics (or the time-domain data based on the amount of messages, X) obtained (401) in the current packet traffic.

Before applying DFT, the average value of X, $\mu_x$, may be subtracted from the time-series data, X. Because the average value of X, $\mu_x$, does not provide further information to discriminate packet traffics (current packet traffic, pre-trained attack packet traffic and pre-trained normal packet traffic) from each others. As the name indicated, $\mu_x$ is the average of all elements in X, which represents itself in frequency domain as a large value (amplitude) in zero Hz. If the DC value remains in X, and because it does not carry any useful information, it may act as the dominant feature in the feature set and decrease the detection performance of the scheme. Hence, with this substraction, the large amplitude in zero Hz frequency can be avoided.

With applying DFT to the time-series data, X, time-domain features are transformed into frequency-domain features, or in other words into a complex time-series data $F_x=\{f_0, f_0, \ldots, f_{N-1}\}$. Each element of $F_x$, $f_k$, carries information related to phase and amplitude of a periodic component with the frequency of 'k' existing in X.

Then, the amplitude value of $f_k$ is taken as $r_k$, and a new time-series $R=\{r_0, r_1, \ldots, r_{N-1}\}$ is obtained (802) to be used as the feature set to discriminate the current packet traffic from the pre-trained attack packet traffic or the pre-trained normal packet traffic, or both. Because the features for the discrimination are based on the energy of the available periodic components contributing to create the time-series and because the amount of energy can be realized by considering the amplitudes of each element in $F_x$.

For easier computations, half of the elements in the new time-series R may also be discarded, as they carry no further information due to being symmetric with respect to the middle element in the new time-series. Hence, half of the elements in the new time-series R, the elements with length of N/2, may be used as the feature set.

It will be understood that the same method steps (401, 802) are also performed for pre-trained attack and normal packet traffics.

An exemplary algorithm to obtain (802, 802) the feature sets is as follows:

```
1:    function Obtain_Feature-set (X)
2:    μx <- mean (X)
3:    X <- X – μx
4:    Fx <- FFT (X) where Fx = {f0, f1, ...., fN-1} , fk = rke^jek and j² = –1.
5:    R <- ABS (Fx) where R = {r0, r1, ...., rN-1} and ABS is the absolute
      function (the ABS of a complex number, a + jb, is √(a²+b²)
6:    R <- R[0 : (N–1)/2]
7:    return R
```

Later, the feature set, R, (the probability distribution of frequency-domain data) obtained (802) in the current packet traffic is compared (805) with at least one of a probability distribution of frequency-domain data obtained (802) in the pre-trained normal packet traffic or in the pre-trained attack packet traffic.

The comparison (805) may be performed after a machine learning, ML model or a statistical inference, STAT, model is trained (803) with the probability distributions of frequency-domain data in the pre-trained normal packet traffic or with the probability distributions of frequency-domain data in the pre-trained attack packet traffic or with both.

The determination of the security attack is called as anomaly-based mode, when the ML/STAT model, which is trained with the probability distribution of frequency-domain data in the pre-trained normal packet traffic, is employed. If the probability distribution of frequency-domain data in the current packet traffic deviates from the probability distribution of frequency-domain data in the pre-trained normal packet traffic, the security attack is determined (404) in the anomaly-based mode. However, the anomaly-based mode is prone to higher false positive rate.

The determination of the security attack is called as signature-based mode or misuse mode, when the ML/STAT model, which is trained with the probability distribution of frequency-domain data in the pre-trained attack packet traffic, is employed. If the probability distribution of frequency-domain data in the current packet traffic does not deviate from (or resembles) the probability distribution of frequency-domain data in the pre-trained attack packet traffic, the security attack is determined (404) in the signature-based or misuse mode. However, the signature-based or misuse mode is impotent to determine zero-day (new) security (DDoS) attacks.

Taking into account their weak and strong sides, the two modes of the security attack determination (404), anomaly-based mode and signature-based/misuse mode, may be employed interchangeably (additionally, alternatively) or simultaneously (concurrently).

The ML model may be a neural network, for example, but it will be understood that other ML models may generally be employed.

The training data used for training the ML model may comprise historical frequency-domain data obtained in accordance with the inventive scheme by applying Discrete Fourier Transform, DFT, to the first statistics. The training data should be labeled as normal or attack in order to be used by the ML model for training. Then the normal packet traffic samples can be obtained from the network during the normal condition of the network, when there is no attack determined (404) in the network. However, two approaches can be utilized to obtain the attack packet traffic. In the first approach, the packet traffic data can be fed to the network at a specific time and in a controlled manner. Then the overall (the combined normal and attack) packet traffic data is sampled and used as the labeled attack packet traffic data. In the second approach, the packet traffic samples, which are detected by the inventive scheme as the attack packet traffic sample, can be used as the attack packet traffic data for training the network.

It will be understood that the employment of an ML model, when compared to rule-based systems, may particularly be beneficial in complex scenarios in which the definition of an excessive number of rules may be inexpedient and when it is difficult to cover all possible cases by rules, avoiding undefined input situations. The ML models may provide decisions effectively regardless of the size of input data. For example, as the amount of input data increases, the maintenance of manually-defined rules-based systems may become more complicated. While, for each new input, new rules may need to be added to the decision-making mechanism in a rule-based system, ML-based decision-making may handle such undefined situations easily. Updating a ML-based system may also be easier because the relevant "rules" may automatically be extracted from the training data by the ML model.

Figure 9:
FIG. 9 shows a flowchart illustrating the method step of initiating the security attack notification to the orchestrator.

FIG. 9 illustrates the method step of initiating (405) the security attack notification to the orchestrator (106).

If, based on the comparison (805) of the probability distributions of frequency-domain data, the security attack is determined (404), a security attack notification to the orchestrator (106) is initiated (405) accordingly. As long as any security attack notification is not initiated (405), the packet traffic is considered a normal packet traffic.

In case of an initiated (405) security attack notification, the orchestrator (106) performs related countermeasures accordingly in order to mitigate the effects of the running DDoS attack security attacks in the network. For example, as depicted in FIG. 1 in a cloud computing environment, each SDN controller (104) can manage a plurality of OF-switches (102), physical or virtual, in the network. Therefore, the proposed inventive solution can be employed in each controller (104) separately to detect the DDoS attacks in the corresponding network. If any SDN controller (104) determines (404, 804) any security attack, it informs the orchestrator (106) which re-routes packets corresponding to the SDN controller (104) residing in the attacked network toward other available SDN controllers (104).

In addition to dynamic resource sharing (e.g. dedication and generation of new computational resources) which is a critical step to provide service to a plethora of connected devices, it is also important in the cloud computing to re-route the users to the new resources in an infinitesimal amount of delay. Hence, meeting the demands can be achieved in the cloud computing environment, as the SDN brings scalability, flexibility and dynamic programmability to the network management.

According to the second aspect, embodiments are performed by at least one SDN controller (104) which can be realized as a piece of hardware or a software, distributed over different entities, either physical or virtualized.

According to the third aspect, embodiments are performed by at least one SDN controller (104) comprising modules; a first-statistics module configured to obtain (401) a first statistics based on an amount of messages (108) received from at least one packet forwarding entity (102) within a pre-defined time interval, t, wherein the first statistics is a time-domain data; a second-statistics module configured to obtain (402) a second statistics based on at least one arriving-time difference, $T_d$, between two consecutive messages (108); a detect module configured to detect (403) an anomaly based on the second statistics; a determine module configured determine (404), if the anomaly is detected (403), a security attack based on the first statistics; a initiate module configured to initiate (405) a security attack notification to an orchestrator (106).

Figure 10:
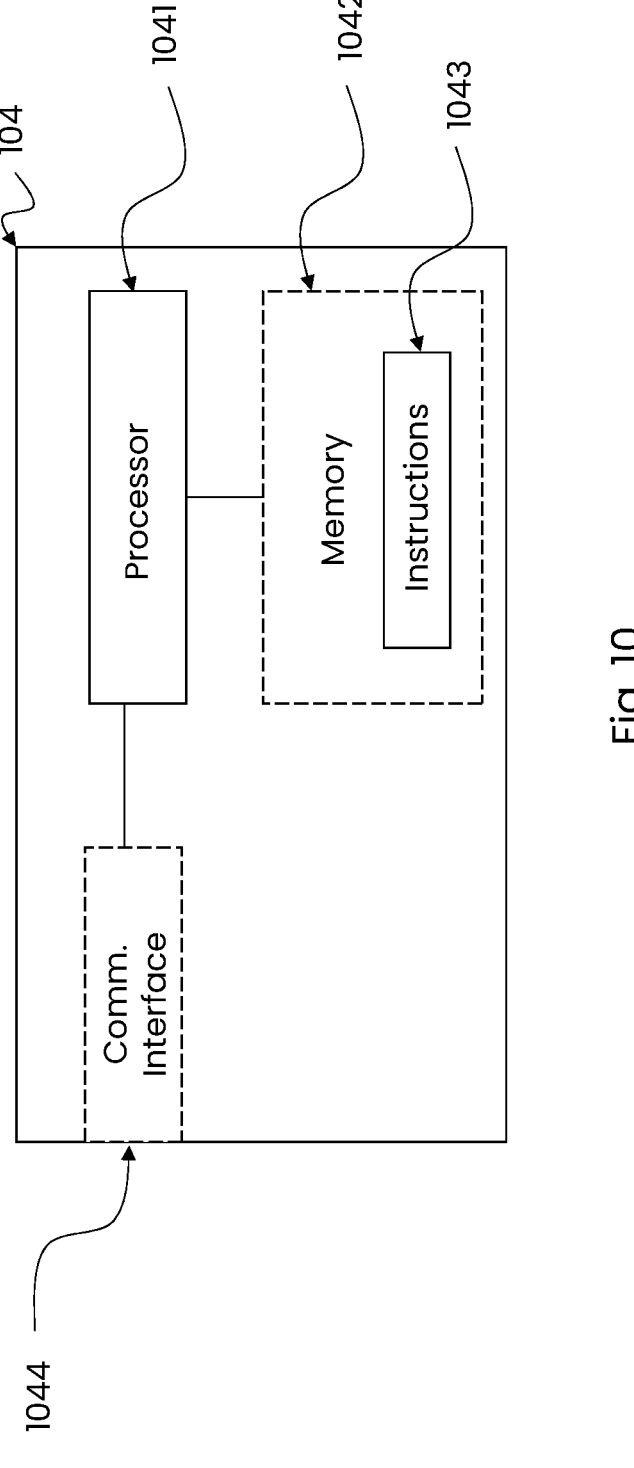
FIG. 10 shows a schematic diagram illustrating an example SDN controller.

FIG. 10 illustrates an example SDN controller (104) in a wireless communication system according to some embodiments herein. Generally, the SDN controller (104) may comprise any component or network function (e.g. any hardware or software module) in the wireless communication system suitable for performing the functions described herein.

The SDN controller (104) is configured (e.g. adapted, operative, or programmed) to perform any of the embodiments of the methods as described above. It will be appreciated that the SDN controller (104) may comprise one or more virtual machines running different software and/or processes. The SDN controller (104) may therefore comprise one or more servers, switches and/or storage devices and/or may comprise cloud computing infrastructure or infrastructure configured to perform in a distributed manner, that runs the software and/or processes.

The SDN controller (104) may comprise a processor (1041), e.g. processing circuitry or logic. The processor (1041) may control the operation of the SDN controller (104) in the manner described herein. The processor (1041) can comprise one or more processors, processing units, multi-core processors or modules that are configured or programmed to control the SDN controller (104) in the manner described herein. In particular implementations, the processor (1041) can comprise a plurality of software and/or hardware modules (1043) that are each configured to perform, or are for performing, individual or multiple steps of the functionality of the SDN controller (104) as described herein.

The SDN controller (104) may comprise a computer-readable storage medium (memory) (1042). In some embodiments, the memory (1042) of the SDN controller (104) can be configured to store program code or instructions (1043) that can be executed by the processor (1041) of the SDN controller (104) to perform the functionality described herein. Alternatively or in addition, the memory (1042) of the SDN controller (104), can be configured to store any requests, resources, information, data, signals, or similar that are described herein. The processor (1041) of the SDN controller (104) may be configured to control the memory (1042) of the SDN controller (104) to store any requests, resources, information, data, signals, or similar that are described herein.

It will be appreciated that an SDN controller (104) may comprise other components in addition or alternatively to those indicated above. For example, in some embodiments, the SDN controller (104) may comprise a communications interface (1044). The communications interface (1044) may be for use in communicating with other nodes in the wireless communication system, such as other physical or virtual nodes. For example, the communications interface (1044) may be configured to transmit to and/or receive from other nodes or network functions requests, resources, information, data, signals, or similar. The processor (1041) of the SDN controller (104) may be configured to control such a communications interface (1044) to transmit to and/or receive from other nodes or network functions requests, resources, information, data, signals, or similar.

According to the fourth and fifth aspect, the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

According to the fourth and fifth aspect, there is provided a computer program product comprising a computer readable medium, the computer readable medium having computer readable code (program) embodied therein, the computer readable code being configured such that, on execution by a suitable computer or processor, the computer or processor is caused to perform the method or methods described herein.

It is to be understood that the examples and embodiments as explained above are merely illustrative and susceptible to various modifications. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The capability of the present disclosure to determine security attacks in wireless communication systems can be seen in an experiment below.

Figure 11:
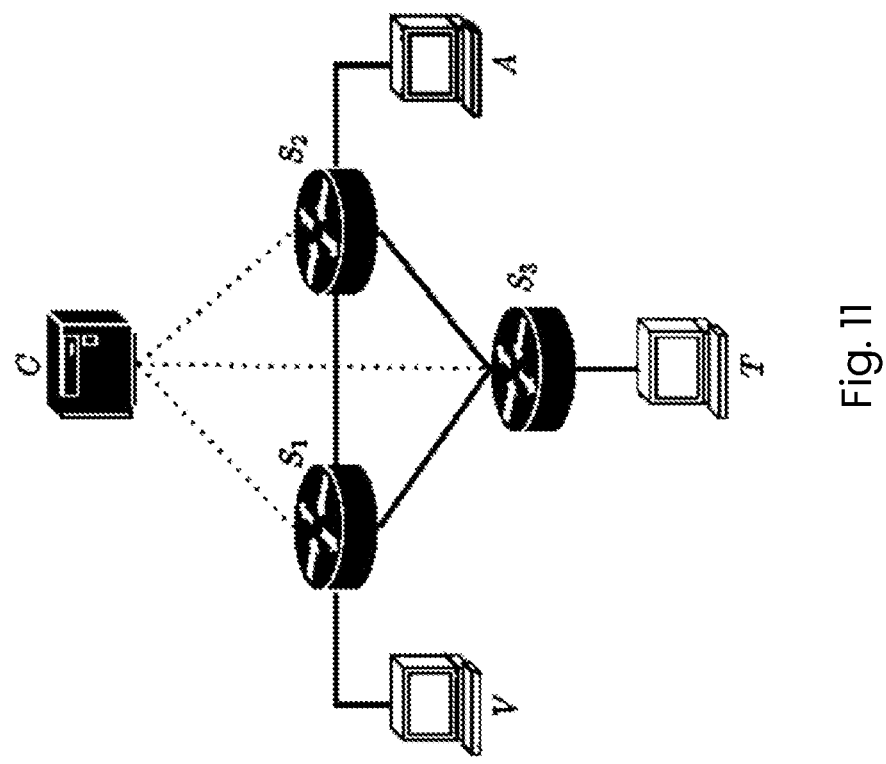
FIG. 11 shows an experimental setup to test the inventive solution.

FIG. 11 illustrates the experimental setup in which Mininet emulator is employed to test and analyze the SDN-based networks.

Mininet creates a realistic virtual network which runs on real kernel, switches and application nodes. Therefore, the obtained result from it is similar to those obtained from real world applications.

The experimental setup consists of a Controller (C), three OF L4-switches (S1, S2, S3) and three nodes of Victim (V), Attacker (A) and Traffic (T), respectively.

The C is a RYU controller which communicates with the switches (S1, S2, S3) by using OF13 protocol.

The nodes V and A are connected to the switches S1 and S2, respectively. The A generates the DDoS attack using Hping3 software. From the V node perspective, a large DDoS attacker army orchestrates the DDoS attack against it, as the source IP addresses are spoofed. Moreover, Hping3 is deliberately configured to generate the attack traffic in medium volume size in order to see the effectiveness of the proposed scheme in determining security attacks with less intensity.

The node T, which is connected to the switch S3, generates User Datagram Protocol, UDP-based normal traffic and generates random source IP addresses. Therefore, the T can be considered as a black box network with many nodes generating UDP traffic.

The amount (number) of Packet-In messages (108) are counted for each time intervals of 10 ms (t=10 ms), and the time-series data X is generated for the length N=256.

Further, a set of arriving-time difference, $T_d$, is obtained by taking 1024 Packet-In message samples.

Figures 12, 13:
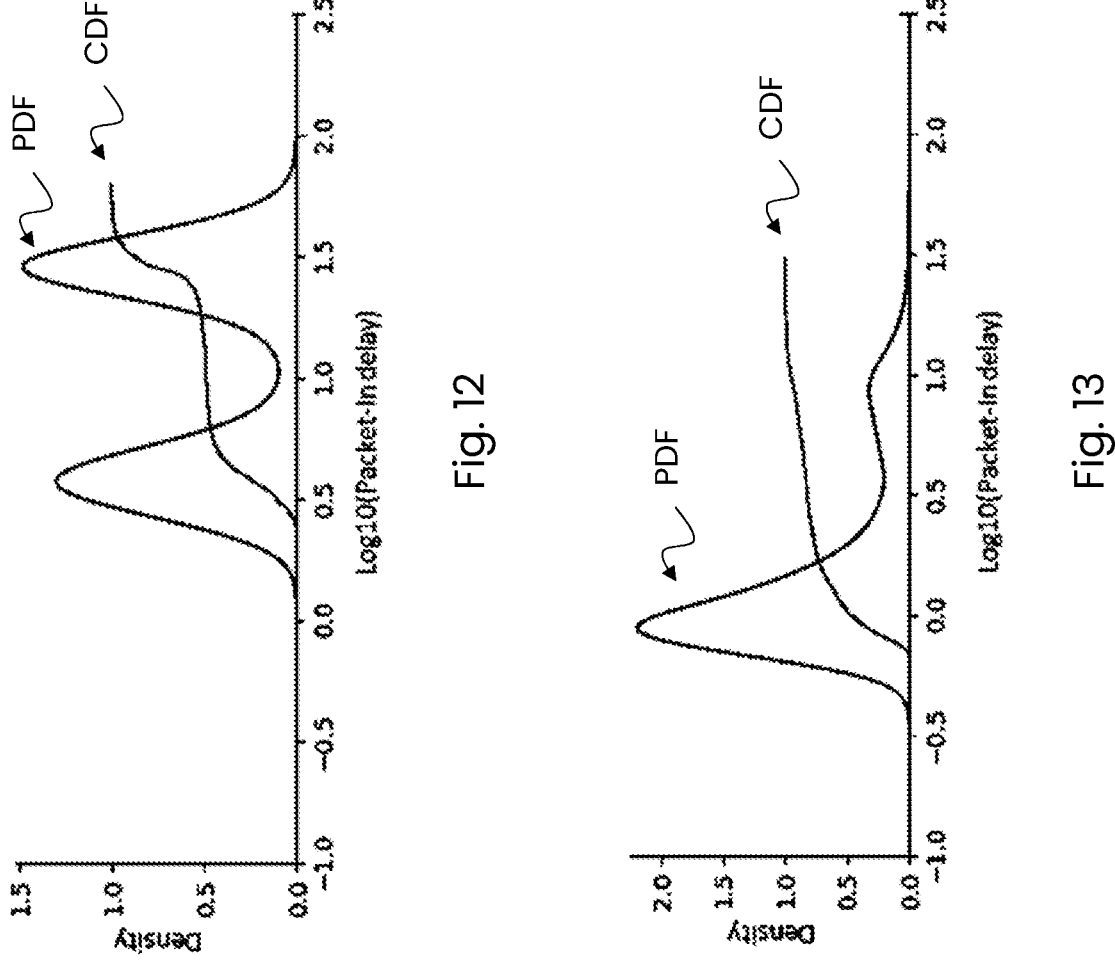
FIGS. 12 and 13 show graphs illustrating the probability distributions of the sets of arriving-time difference in the normal and the attack (current) packet traffics.

FIG. 12 illustrates the probability distributions (PDF and CDF) of the sets of arriving-time difference, $T_d$, of the attack packet traffic. FIG. 13 illustrates the probability distributions (PDF and CDF) of the sets of arriving-time difference, $T_d$, of the normal packet traffic. The attack packet traffic in the experiment should be considered as the current packet traffic in the Detailed Description above.

In the experiment, logarithmic values of the arriving-time differences, $T_d$, are taken into account in order to make the comparison of PDFs and CDFs easier.

An anomaly (distinction) can be clearly detected (403, 703) in the comparison (704) between the probability distributions (PDF and CDF) of the sets of arriving-time difference, $T_d$, e.g. the associated arriving-time difference, $T_d$, values for the normal packet traffic are mostly distributed in higher values, when compared to those of the attack (current) packet traffic.

Figures 14, 15:
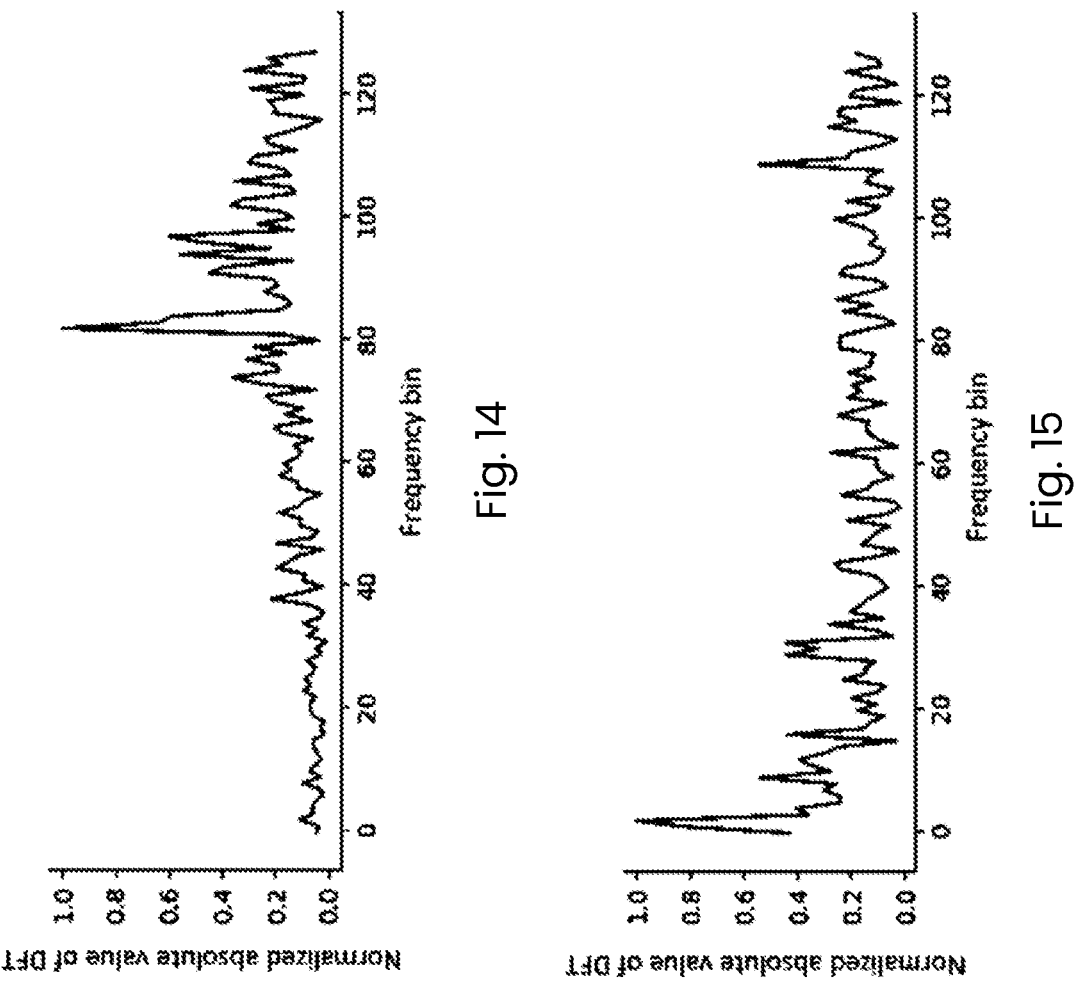
FIGS. 14 and 15 show graphs illustrating the probability distributions (feature sets) of the frequency-domain data in the normal and the attack (current) packet traffics.

FIG. 14 illustrates the probability distribution of frequency-domain data (feature sets, R) in the normal packet traffic. FIG. 15 illustrates the probability distribution of frequency-domain data (feature sets, R) in the attack (current) packet traffic.

A security attack can be clearly determined (404) in the comparison (805) between the probability distribution of frequency-domain data (feature sets, R) in the normal packet traffic and the probability distribution of frequency-domain data (feature sets, R) in the attack (current) packet traffic e.g. the associated energy (amplitude) values (y axis) reside mostly in higher frequency bands (on the right side of x axis) in the normal packet traffic, while they are mostly in lower frequency bands in the attack (current) packet traffic.

Finally, based on the determined (404) security attack, a security attack notification to the orchestrator (106) is initiated (405).

The invention claimed is:

1. A method performed by a controller in a wireless communication system for determining a security attack, the method comprising:

obtaining a first statistics based on an amount of messages received from at least one packet forwarding entity within a pre-defined time interval, t, wherein the first statistics is a time-domain data;

obtaining a second statistics based on at least one arriving-time difference, $T_d$, between two consecutive messages;

detecting an anomaly based on the second statistics;

determining, if the anomaly is detected, a security attack based on the first statistics;

initiating a security attack notification to an orchestrator; and comparing, in the step of detecting the anomaly, the obtained single arriving-time difference, $T_d$, with an obtained pre-trained threshold value, TH, wherein the anomaly is detected, if the single arriving-time difference, $T_d$, is less than the pre-trained threshold value, TH, wherein the pre-trained threshold value, TH, is an intersection point of an empirical probability distribution curve obtained from a set of arriving-time difference, $T_d$, in a pre-trained normal packet traffic and an empirical probability distribution curve obtained from a set of arriving-time difference, $T_d$, in a pre-trained attack packet traffic.

2. The method of claim 1, further comprising:

comparing, in the step of detecting the anomaly, an obtained probability distribution of a set of arriving-time difference, $T_d$, with a probability distribution of a set of arriving-time difference, $T_d$, obtained in the pre-trained normal packet traffic.

3. The method of claim 2, wherein the obtained probability distributions are one of Cumulative Distribution Function, CDF, or Probability Distribution Function, PDF.

4. The method of claim 3, wherein logarithmic values of arriving-time difference, $T_d$, are used for the obtained probability distributions.

5. The method of claim 1, further comprising:

comparing, in the step of determining the security attack, an obtained probability distribution of frequency-domain data with at least one of a probability distribution of frequency-domain data obtained in the pre-trained normal packet traffic or in the pre-trained attack packet traffic.

6. The method of claim 5, wherein the frequency-domain data are obtained by applying Discrete Fourier Transform, DFT, to the first statistics.

7. The method of claim 6, wherein a machine learning, ML, model or a statistical inference, STAT, model is trained with the probability distributions of frequency-domain data obtained in the pre-trained normal and in the pre-trained attack packet traffic.

8. The method of claim 1, wherein the messages received from the at least one packet forwarding entity within the pre-defined time interval, t, are Packet-In messages encapsulated as packets according to a protocol employed by the controller.

9. The method of claim 8, wherein the protocol employed by the controller is an OpenFlow, OF, protocol to communicate with the at least one packet forwarding entity.

10. The method of claim 1, wherein the at least one packet forwarding entity is a physical or a virtual OpenFlow, OF, switch.

11. The method of claim 1, wherein the controller in the wireless communication system for determining the security attack is a Software-Defined Networking, SDN, controller.

12. The method of claim 11, wherein the security attack determined by the Software-Defined Networking, SDN, controller in the wireless communication system is a Distributed Denial of Service, DDoS, attack.

13. A controller for determining a security attack in a wireless communication system, configured to:

obtain a first statistics based on an amount of messages received from at least one packet forwarding entity within a pre-defined time interval, t, wherein the first statistics is a time-domain data;

obtain a second statistics based on at least one arriving-time difference, Ta, between two consecutive messages;

detect an anomaly based on the second statistics;

determine, if the anomaly is detected, a security attack based on the first statistics;

initiate a security attack notification to an orchestrator; and compare, in the step of detecting the anomaly, the obtained single arriving-time difference, $T_d$, with an obtained pre-trained threshold value, TH, wherein the anomaly is detected, if the single arriving-time difference, $T_d$, is less than the pre-trained threshold value, TH, wherein the pre-trained threshold value, TH, is an intersection point of an empirical probability distribution curve obtained from a set of arriving-time difference, $T_d$, in a pre-trained normal packet traffic and an empirical probability distribution curve obtained from a set of arriving-time difference, $T_d$, in a pre-trained attack packet traffic.

14. The controller of claim 13, further configured to:

compare, in the step of detecting the anomaly, an obtained probability distribution of a set of arriving-time difference, $T_d$, with a probability distribution of a set of arriving-time difference, $T_d$, obtained in the pre-trained normal packet traffic.

15. The controller of claim 14, wherein the obtained probability distributions are one of Cumulative Distribution Function, CDF, or Probability Distribution Function, PDF.

16. The controller of claim 15, wherein logarithmic values of arriving-time difference, $T_d$, are used for the obtained probability distributions.

* * * * *